(12) United States Patent
Nieuwkerk et al.

(10) Patent No.: US 7,636,195 B2
(45) Date of Patent: Dec. 22, 2009

(54) MIRROR WITH BUILT-IN DISPLAY

(75) Inventors: Armanda Cinderella Nieuwkerk, Eindhoven (NL); Martinus Hermanus Wilhelmus Maria Van Delden, Eindhoven (NL); Emiel Peeters, Eindhoven (NL); Bianca Maria Irma Van Der Zande, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 371 days.

(21) Appl. No.: 10/597,058

(22) PCT Filed: Jan. 4, 2005

(86) PCT No.: PCT/IB2005/050018

§ 371 (c)(1),
(2), (4) Date: Jul. 10, 2006

(87) PCT Pub. No.: WO2005/071645

PCT Pub. Date: Aug. 4, 2005

(65) Prior Publication Data

US 2008/0285128 A1    Nov. 20, 2008

(30) Foreign Application Priority Data

Jan. 15, 2004   (EP)   ................... 04100107

(51) Int. Cl.
G02B 5/30  (2006.01)

(52) U.S. Cl. ...................................... 359/485; 359/501
(58) Field of Classification Search ................. 359/485, 359/487, 601–603, 609, 630, 501; 353/20; 349/96; 345/7–9
See application file for complete search history.

(56) References Cited

U.S. PATENT DOCUMENTS

| | | | | | |
|---|---|---|---|---|---|
| 2,991,697 | A | * | 7/1961 | Vetere | 359/596 |
| 4,630,904 | A | * | 12/1986 | Pastore | 359/636 |
| 6,106,121 | A | * | 8/2000 | Buckley et al. | 359/839 |
| 2004/0100598 | A1 | * | 5/2004 | Adachi et al. | 349/113 |
| 2007/0183037 | A1 | * | 8/2007 | De Boer et al. | 359/487 |

FOREIGN PATENT DOCUMENTS

| | | |
|---|---|---|
| WO | WO 02/69031 | 4/2001 |
| WO | WO 02/069031 A1 * | 9/2002 |
| WO | WO 03/079318 A1 | 9/2003 |
| WO | WO 03/079318 A1 * | 9/2003 |

* cited by examiner

Primary Examiner—Lee Fineman

(57) ABSTRACT

A mirror device (1) which can be simultaneously used for display purposes, based on e.g. an LCD display (5) with a polarizing mirror (2) placed in front of it. When the surface area occupied by the display is smaller than the surface area of the mirror, the smaller display can be easily recognized at the front of the mirror. This is masked by introducing absorbing polarizers (30, 40).

12 Claims, 4 Drawing Sheets

MIRROR WITH BUILT-IN DISPLAY

Figure 1:

The invention relates to a polarizing mirror for viewing purposes having a first plane reflecting light of a first kind of linear polarization to a viewing side, the mirror passing light of a second kind of linear polarization and being provided with a display device at its non-viewing side, which display device during use provides light of a second kind of linear polarization. A "mirror for viewing purposes" or "display mirror" in this application refers to a mirror, via which a person's eye (or an artificial eye like a (infra-red) camera lens) sees a reflected part of the outside world. As examples one may think of large mirrors, like bathroom mirrors, full-length mirrors in fitting rooms or even mirrored walls. Other examples are medium sized or small mirrors, like outside mirrors for trucks or dressing-table mirrors.

By "having a first plane reflecting light of a first kind of linear polarization" it is meant that a mirror plane acts as a polarizing plane. When in use, light within a certain range of a wavelength of light incident on a polarizing plane will be divided in two components one which is reflected by the polarizing plane and one of which passes through the polarizing plane. Generally most known is the division of light in two components having linearly polarized, perpendicular directions of linear polarization. In the examples of this particular application light is generally supposed to be divided in said linearly polarized, perpendicular directions of polarization, but the invention is equally applicable to light being divided in right-handed and left-handed circular polarization.

A display mirror of the kind mentioned above is described in the pending European Applications Serial number 02076069.2, filed on Mar. 18, 2002 and Serial number 02079306.3, filed on Oct. 17, 2002 (=PH NL 02.1038). The mirror function is obtained by introducing a polarizing mirror or reflective polarizer instead of a partly reflecting layer in front of a display device.

In practice it is not always desirable to use display devices and polarizing mirrors of equal size. For example, in hallway mirrors, bathroom mirrors, and car rearview mirrors it is often sufficient, and cheaper, that only a (relatively) small part of the mirror accommodates a display. Thus the surface area occupied by the display is smaller than the available surface area behind the mirror. However due to optical properties at the area of the display being different from optical properties at the further area of the polarizing mirror, a smaller display can be easily recognized at the front of the mirror, which may be disturbing to the viewer. To overcome this a light-shield used at the back of the mirror may be used preventing light, originating from sources other than the display, from being transmitted from the back of the mirror towards the front. Such light-shields often also act as a mechanical support for the display mirror, and consists for instance of a wooden or metal plate which is e.g. coated with black velvet or black paint. Despite this approach, it is often still possible to differentiate between the display area and its surroundings due to a kind of edge effect.

The present invention has as one of its goals to overcome these problems at least partially.

To this end a polarizing mirror according to the invention has at its non-viewing side at least partly an absorbing polarizer. Preferably this absorbing polarizer is applied at the back of the polarizing mirror device, but has its polarization direction rotated over an angle of 90 degrees with respect to the first polarizer (the mirror). Depending on the type of light-shield used, the polarizer is either applied over the whole area of the light-shield, or only at the area not accommodating the display. If the absorbing polarizer is made of the same material as that of the absorbing polarizer of the display and applied at the inside of an enclosing housing the properties of the reflected image are substantially equally affected for both areas. Moreover at maximum absorption both at the light-shield and the display the perception of the reflected image is improved.

In a preferred embodiment the absorbing polarizing layer and the polarizing mirror at its non-viewing side both comprise, a retardation layer such as a ¼λ foil, λ having a wavelength-value of e.g. 550±20 nm. The display can be moved freely, now and/or be rotated over any angle between the polarizing mirror and the absorbing polarizer (within the enclosing light-shield) which is favorite in view of manufacturing tolerances.

If the absorbing polarizing layer comprises sub-layers absorbing light of the first kind of linear polarization and absorbing light of the second kind of linear polarization a very good display performance with optimum mirror performance is obtained.

In one embodiment at least one retardation layer is provided between the display device and the polarizing mirror, such as a retardation layer comprising at least one ½λ foil, λ having a wavelength-value of e.g. 550±20 nm.

These and other aspects of the invention are apparent from and will be elucidated with reference to the embodiments described hereinafter.

Figure 2:
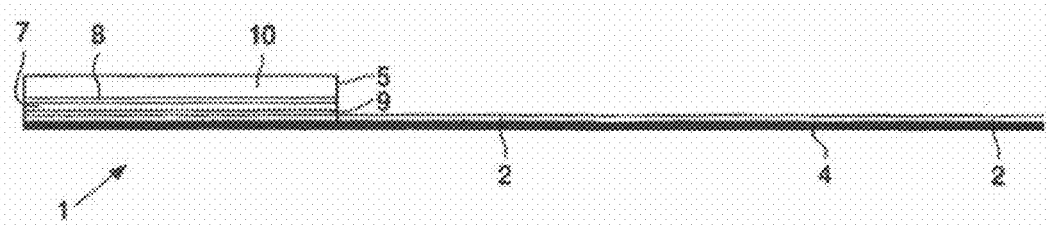

In the drawings:

FIG. 1 is a possible embodiment of a mirror device according to the invention, while FIG. 2 is a diagrammatic cross-section of a part of such a mirror device.

Figure 3A:
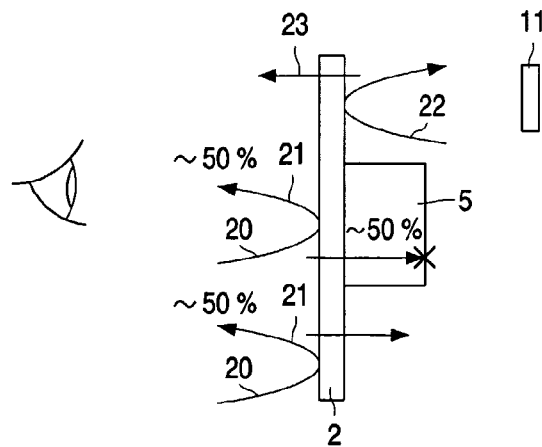
Figure 3B:
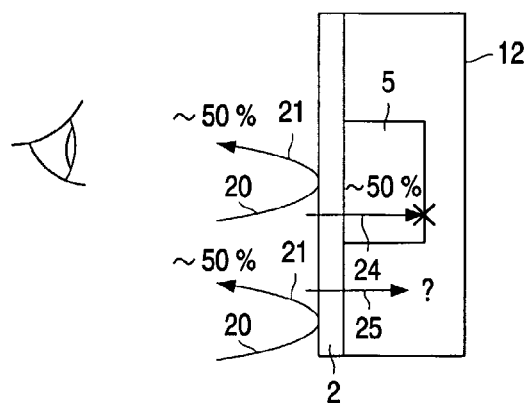
Figure 4:
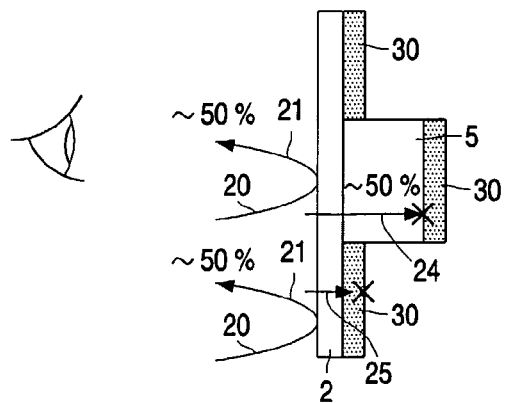
Figure 5:
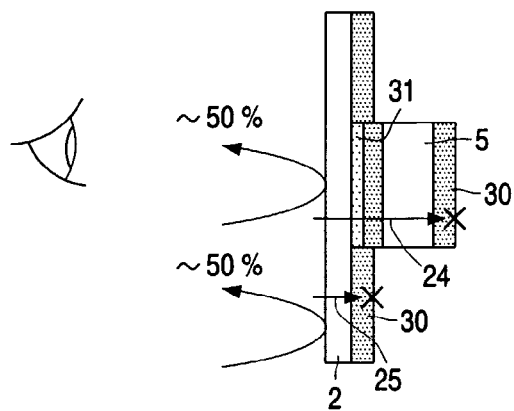
Figure 6:
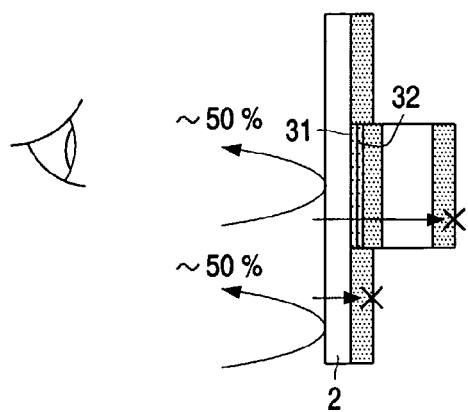
Figure 7:
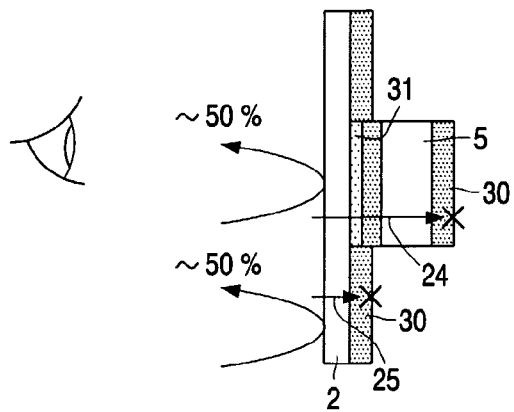
Figure 8:
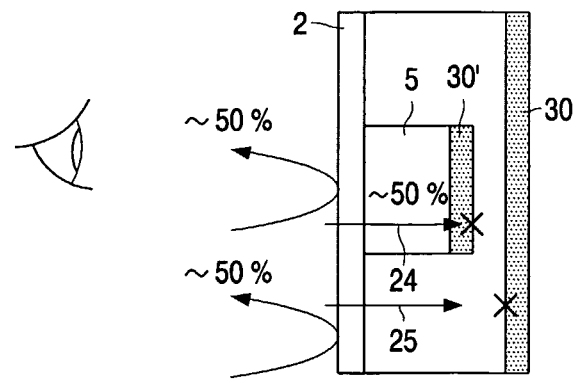
Figure 9:
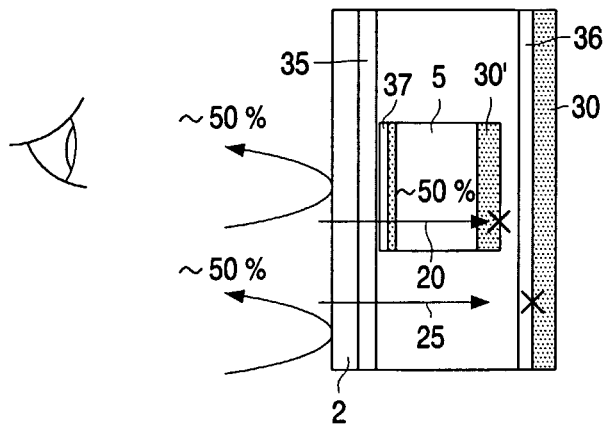
Figure 10:
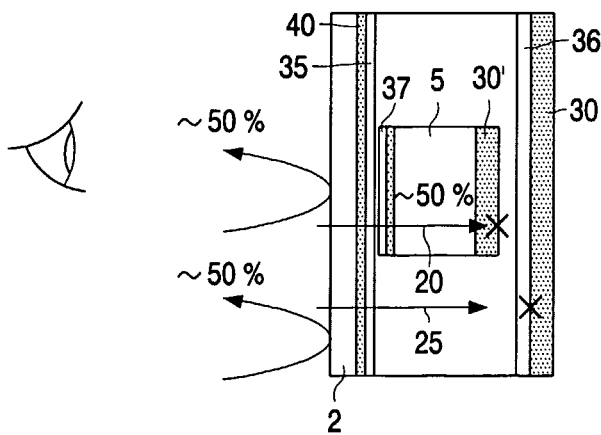

FIGS. 3a and 3b each represent a diagrammatic cross-section of a part of a mirror device according to the invention, FIG. 4 is a diagrammatic cross-section of a part of another mirror device according to the invention, FIGS. 5 and 6 show diagrammatic cross-sections of further devices according to the invention, while FIGS. 7 and 8 show further diagrammatic cross-section of a part of another mirror device according to the invention, and FIGS. 9 and 10 show further embodiments.

The Figures are diagrammatic and not drawn to scale. Corresponding elements are generally denoted by the same reference numerals.

FIG. 1 shows a mirror device 1 for viewing purposes having on a glass plate or any other substrate 4 a polarizing mirror 2 reflecting light, so a person 3 sees his image 3' (and further background, not shown). According to the invention the mirror (plane) only reflects light of a first kind of linear polarization (direction), but passes light of a second kind of linear polarization (direction). Furthermore the polarizing mirror is provided with a display device 5 at its non-viewing side (see also FIG. 2).

The display device 5 in this example is a liquid crystal display device having between two substrates (glass or plastic or any other suitable material) a liquid crystal material 7. Since most liquid crystal display devices are based on polarization effects the display 5 during use substantially emits polarized light. In general light from a backlight 10 is modulated by the liquid crystal display effect. Since the liquid crystal display device is based on a polarization effect the display 5 comprises a first polarizer 8 and a second polarizer (or analyzer) 9, which passes light of a certain polarization (direction).

This light of a certain polarization has the same (linear) polarization direction as the second kind of polarization (direction), so it passes the mirror (plane) 2 without any loss of light (100% transmission).

Since most liquid crystal display devices are based on modulation of linearly polarized light, linear polarizers 8, 9 are used, and the mirror 2 also is a linear polarization selective mirror e.g. a stack of dielectric layers, each layer having an optical thickness of one-quarter of a selected wavelength (or a mean value for a spectrum), while the layers have selected refractive indices or a wire-grid polarizer.

On the other hand in certain applications it may even be attractive to polarize light from e.g. an (O)LED or any other display to (linear or circular) polarized light to obtain the effect of a high contrast of displayed information with respect to reflected images in mirror applications.

In practice it is not always possible or desirable to use displays and polarizing mirrors of the same size. For example, in hallway mirrors, bathroom mirrors, and car rearview mirrors it is often sufficient, and cheaper if only a (relatively) small part of the mirror accommodates a display. So the surface area occupied by the display is smaller than the available surface area behind the mirror, similar to the device of FIGS. 1, 2.

However, when not taken care of properly, the smaller display can be easily recognized at the front of the mirror. This is in particular disturbing when the display-mirror operates as a viewing mirror. FIG. 3 shows a part of a mirror according to the invention in which a liquid crystal display device 5 is used. Incident light 20 reflects partly (one polarization direction) on the mirror 2 (arrow 21). Generally a light-shield is used at the back of the mirror to prevent light originating from sources 11, other than the display, e.g. spurious light sources from being transmitted from the back of the mirror 2 towards the front (see FIG. 3a, for clarity, simply to explain the invention not all elements of the display are shown in FIG. 3). FIG. 3a shows two distinct surface areas of the polarizing mirror 2. One area substantially coincides with the display panel, while a surrounding area does not. Light originating from a source 11 may be partly reflected by the back of the mirror 2 (arrow 22); another part (arrow 23) however, may pass the mirror 2.

According to the invention, the mechanical support 12 for the mirror, which consist for instance of a wooden or metal plate or cabinet (see FIG. 3b) also acts as a light absorbing element. To this end the back of the polarizing mirror 2 is e.g. coated with black velvet or black paint (in order to resemble the properties of the display) while the area matching the display in size and orientation is cut out. Despite this approach, it is often still possible to differentiate between the display area and its surroundings due to the so-called edge effect.

FIG. 3b shows the existence of two distinct surface areas of the polarizing mirror 2. One area substantially coincides with the display panel, while a surrounding area is backed by a light-shield or cabinet 12. For incident light having a polarization direction of the first kind, both areas have identical reflective properties. Thus although the properties of the reflected light may be altered by the properties of the mirror, the properties of the devices and/or materials behind the polarizing mirror will not or hardly be revealed.

For incident light having a polarization direction of the second kind, however, the light will pass the polarizing mirror 2 (reflective polarizer). Only for a partial area of the mirror this light will subsequently fall onto a display panel (arrow 24), where it is predominantly absorbed (at least in this example e.g. due to the presence of an absorbing polarizer located at the back of the display). Thus hardly any light of the second kind is in turn reflected towards the front of the mirror, where it would contribute to a degraded perception of the reflected image (arising from light of the first kind).

For the surrounding area of the display, however, the reflection of light (of the second kind (arrow 25)) is determined by the properties of enclosing light-shield. Thus any mismatch in the properties of the two areas in terms of absorption, depolarization or residual reflection, will result in e.g. edge effects (observed at the transition region from one area to the other) and a degradation of perceived reflected image.

FIG. 4 shows an embodiment according to the invention in which these problems have been overcome by applying an absorbing polarizing layer 30, which is applied at the back of the polarizing mirror 2 absorbing light of the second kind of linear polarization (having its polarization direction rotated over an angle of 90 degrees with respect to the polarization direction of the polarizing mirror 2).

Since the properties of the area other than the display area (behind the mirror) are very closely matched to those of the display area, light (of the second kind (arrow 25)) is now completely absorbed. Depending on the type of light-shield and display used, the absorbing polarizer 30 is either applied over the whole area of the polarizing mirror 2, or only at the area not accommodating the display. The absorbing polarizer 30 is preferably made of the same material as that of the polarizing mirror 2 and applied at the inside of an enclosing cabinet, which also acts as a light-shield. Thus the properties of the reflected image are equally affected for both areas. In ensuring maximum absorption at the light-shield and the display, the perception of the reflected image is improved.

In the embodiment of FIG. 4 the absorbing polarizer 30 is applied locally at a further distance from the polarizing mirror 2, so it must be cut in parts and be aligned; another possibility would be to cut out the area for the display. In both solutions the display must be located at a fixed and pre-set position, which is quite laborious.

In the embodiment of FIG. 5 this has been overcome by introducing a retarder, in this example a retarder layer (or polarization rotating foil) 31, which rotates the polarization of the first kind, such that after passing said layer the polarized light passes the locally applied parts. This implies that incident polarized light of the second kind, which passes the polarizing mirror 2, is rotated, but this does not affect the mirror function. Polarized light of the second kind as provided by the display device now passes both the foil 31 and the polarizing mirror 2. In this example a ½λ foil, having its orientation direction at 45 degrees with respect to the polarization direction of the polarizing mirror 2 is used, which may be a broad-band or a narrow-band foil. Now, it is true, the foil 31 must be applied and aligned first but no cutting of the absorbing polarizer is needed (at the expensive of introducing topography at the overlap of the foil 31 and absorbing polarizer foil).

Also the display has to be located at a fixed and pre-set position while a single half-wave foil may introduce some discoloration of the transmitted image. The latter is overcome in the embodiment of FIG. 6, in which two ½λ foils 31, 32 are provided being aligned at an angle of about 45 degrees with respect to each other. In this example one half-lambda foil 31 has its orientation direction at 22.5 degrees with respect to the polarization direction of the polarizing mirror 2 and a second half-wave foil at 67.5 degrees with respect to the polarization direction of the polarizing mirror 2. Now however the foils 31, 32 must be applied and aligned first.

In the embodiment of FIG. 7 the polarization directions of the polarizing mirror 2 and absorbing polarizer foil 30 differ 90 degrees with the exception of the area accommodating the display, which is accomplished by means of a lithographically patterned retardation film (in this arrangement at 45 degrees). This film can be spun, and be patterned or not at will, while topography is avoided, at no absorbing polarizer costs, while a single patterned retardation film can simultaneously be optimized for the wavelengths of interest. When tuned to the properties of the reflective polarizer, the color properties of the reflective polarizer can also be adjusted.

In the embodiment of FIG. 8 the polarization directions of the polarizing mirror 2 and absorbing polarizer foil 30 differs 90 degrees with respect to the absorbing polarizer foil 30 at the light-shield or cabinet 12 and also differ 90 degrees with respect to a further absorbing polarizer foil 30' at the back of display device 5. Although the display device 5 must be aligned to the transmission axes of the foils, translation of the display device in the XY plane is possible, but no rotation.

Retardation is possible in the embodiment of FIG. 9 in which the display can be placed anywhere, and anyhow. This is achieved by applying a quarter-wave foil 35 at the back of the reflective polarizing mirror 2, a quarter-wave foil 36 on the absorbing polarizer foil 30 and a quarter-wave foil 37 on the display device 5. The absorbing polarizer foil 30 may be a crossed absorbing polarizer stack located at the light-shield. Thus the display can be translated freely, and/or be rotated over any angle within the enclosing light-shield or cabinet 12. It is this combination that combines the best display performance with the best mirror performance. This set-up is very useful in any device in which circular polarized light is obtained by any kind of elements If necessary the mirror 2 may be backed with an additional absorbing polarizer 40. (FIG. 10)

The protective scope of the invention is not limited to the embodiments described. For instance, as mentioned, light from e.g. an (O)LED may be polarized or it may even be attractive to use other display effects to obtain the effect of a high contrast of displayed information with respect to reflected images in mirror applications.

Also more than one display can be integrated in the mirror, whereas many other applications areas can be thought of. In some applications, if a matrix form is used, with adequate driving circuitry the switching between mirror-state and display state can be done locally.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A polarizing mirror for viewing purposes having:
   a first plane reflecting light of a first kind of polarization to a viewing side, the mirror passing light of a second kind of polarization and
   a foil on a non-viewing side of said mirror, said foil being orientated at a known angle with respect to said first kind of polarization; and
   display device, at its non-viewing side, which display device, during use, provides light of the second kind of polarization, the polarizing mirror having on the non viewing side at least partly at least one absorbing layer, wherein said foil and said absorbing layer comprise a retarder layer causing rotation of said light over a known number of degrees.

2. A polarizing mirror as claimed in claim 1 wherein the at least one absorbing layer comprising an absorbing polarizing layer.

3. A polarizing mirror as claimed in claim 2 the absorbing polarizing layer absorbing light of the second kind of polarization.

4. A polarizing mirror as claimed in claim 2, having a structured polarizing layer.

5. A polarizing mirror as claimed in claim 2, wherein the absorbing polarizing layer and the polarizing mirror at its non-viewing side rotates the polarization over substantially 45 degrees.

6. A polarizing mirror as claimed in claim 1, wherein the foil comprising a ¼λ foil.

7. A polarizing mirror as claimed in claim 5, the absorbing layer comprising sub-layers absorbing light of the first kind of polarization and absorbing light of the second kind of polarization.

8. A polarizing mirror as claimed in claim 7, wherein the absorbing layer is provided at least at a non-display area associated with the display device.

9. A polarizing mirror as claimed in claim 1, wherein said retardation layer between the display device and the polarizing mirror rotates the polarization over substantially 90 degrees.

10. A polarizing mirror as claimed in claim 1, the foil comprising at least one ½λ foil.

11. A polarizing mirror as claimed in claim 1, in which the polarizing mirror has a housing, the housing at least at the back of the display device at its inner side being provided with an absorbing polarizer.

12. A polarizing mirror as claimed in claim 1, the display device having at the non-viewing side of the polarizing mirror an absorbing polarizer.

* * * * *